(12) United States Patent
Stutz et al.

(10) Patent No.: US 6,666,168 B2
(45) Date of Patent: Dec. 23, 2003

(54) WATERFALL AQUARIUM CLEANSING SYSTEM

(76) Inventors: Karl H. Stutz, 5328 W. Waveland Ave., Chicago, IL (US) 60641; Timothy N. Curameng, 140 W. Delavan, Wisconsin Dells, WI (US) 53965

( * ) Notice: Subject to any disclaimer, the term of this patent is extended or adjusted under 35 U.S.C. 154(b) by 0 days.

(21) Appl. No.: 10/141,270

(22) Filed: May 8, 2002

(65) Prior Publication Data

US 2003/0209204 A1 Nov. 13, 2003

(51) Int. Cl.[7] .............................................. A01K 63/04
(52) U.S. Cl. .................... 119/259; 119/263; 119/264
(58) Field of Search ................................ 119/259, 263, 119/264

(56) References Cited

U.S. PATENT DOCUMENTS

| | | | | |
|---|---|---|---|---|
| 460,809 A | * | 10/1891 | Gunther | 119/264 |
| 475,082 A | * | 5/1892 | Gunther | 119/264 |
| 3,638,616 A | * | 2/1972 | Carmouche | 119/261 |
| 3,759,223 A | * | 9/1973 | D'Andrea | 119/259 |
| 3,785,342 A | * | 1/1974 | Rogers | 119/259 |
| 4,156,401 A | * | 5/1979 | Ogui | 119/259 |
| 4,752,388 A | * | 6/1988 | Ng | 210/169 |
| 5,290,437 A | * | 3/1994 | Lin | 210/169 |
| 5,640,930 A | | 6/1997 | Kirby | 119/263 |
| 5,690,054 A | * | 11/1997 | Allen | 119/259 |
| 5,849,185 A | * | 12/1998 | Judy, Jr. | 210/169 |

* cited by examiner

*Primary Examiner*—Charles T. Jordan
*Assistant Examiner*—Bret Hayes
(74) *Attorney, Agent, or Firm*—Greer, Burns & Crain, Ltd.

(57) ABSTRACT

A waterfall aquarium cleansing system provides a tank that includes a base, a pair of first sides, a pair of second sides, the first and second sides having a height all defining a main chamber. A filter is provided that is in fluid communication with the base and is disposed relative thereto to define a retention area. The base defines at least one aperture that is in communication with the retention area. The retention area is configured for agitation-free collection of sediment from the main chamber for subsequent removal through the at least one aperture.

19 Claims, 6 Drawing Sheets

WATERFALL AQUARIUM CLEANSING SYSTEM

BACKGROUND OF THE INVENTION

The present invention relates generally to an improved system for easily and efficiently cleaning an aquarium. More particularly, the present invention enables the user to significantly decrease the amount of water handled during the cleaning process as well as the amount of disturbance to tank inhabitants.

Many people enjoy having aquariums in their homes, but the feeling of joy often leads to dread when the tank must be cleaned. A known hose siphoning method, for example, for cleaning the tank is very burdensome and undesirable. Aquarium owners typically follow the rule of thumb that a regular cleaning requires one-fourth to one-third of the "bottom" water being "pulled" or siphoned out once a month. This means that for a typical twenty-gallon tank, for example, five to seven gallons must be removed for cleaning. During this process, a user must perform various unpleasant tasks such as carrying numerous heavy buckets of water to and from the tank. The buckets removed from the tank are often filthy, especially for those who too long delayed the process. Also, either hands, arms, lips or all often make contact with the filthy water when using this siphoning hose. This is easily the most dreadful part of the cleaning process. In addition, the hose siphoning method causes stirring up of the sediment, thereby disturbing the aquarium atmosphere, the fish, and other tank inhabitants as well. As a result, the goal of completely removing sediment is rendered impossible. This conventional method causes stress on the fish, the other tank inhabitants, as well as the user.

Therefore, in cleaning a fish tank, there is a need for a system that does not stir up the sediment so that a significantly cleaner fish tank is possible. There is also a need to greatly reduce the amount of water that a user must carry and come into contact with during the cleaning process. Furthermore, it is desirable that the amount of time and labor it takes to clean a fish tank be reduced.

One approach to this problem has been to provide an aquarium cleaning system with a funnel-like chamber beneath the tank for receiving sediment. Sediment passes from the main aquarium chamber through a screen into the lower collection chamber. The system further includes a source of pressurized air for both aerating the main chamber and for agitating the sediment and thus facilitating its collection in the bottom of the funnel for eventual disposal. A valve is positioned at a lower end of the chamber for releasing and eliminating collected sediment from the collection chamber.

A disadvantage of the known system is that the forced air agitation of the lower chamber may impede the natural collection of sediment. Another disadvantage of the present system is that the presence of air circulation tubes beneath the surface of the main aquarium chamber requires a settling chamber of relatively tall height. This tall lower chamber increased required materials and is visually undesirable. Also, in applications where space is limited, the chamber may reduce the available aquarium volume.

Therefore, it is an object of the present invention to provide an improved aquarium cleansing system designed to prevent stirring up of the sediment within lower and upper tank chambers during the cleaning process.

Another object of the present invention is to provide an improved aquarium cleansing system which creates a less burdensome and more efficient removal of sediment which has settled at the bottom of the tank.

SUMMARY OF THE INVENTION

The above-identified objects are met or exceeded by the present waterfall aquarium cleansing system. The present invention provides a system where achieving a significantly cleaner fish tank is a fast and easy process whereby the volume of water handled and the amount of time spent cleaning are significantly reduced. Fish tank dwellers as well as fish tank owners are less stressed because during the cleaning process, sediment is not stirred up about the tank or in a sediment collection retention area beneath the main tank chamber.

A pulling/settling action in the present invention caused by differential pressure gradients allows sediment and the conventional scale from evaporated hard water to progress downward to the tank bottom, through a gravel layer, and also through a porous filter. Once the sediment and hard water solids have passed through the filter, they accumulate without agitation in a retention area defined by the bottom side of the filter and a tank base. The base preferably includes a concave reservoir portion that gradually tapers toward at least one preferably centrally disposed aperture in a floor of the base. The at least one aperture allows the sediment and water to be easily drained from the tank.

More specifically, the present invention provides a tank that includes a base, a first side, a second side, and the first and second sides having a height all defining a main chamber. A filter is also provided that is in fluid communication with the base and disposed relative thereto to define a retention area above the base. At least one aperture in communication with the retention area is formed in the base. The retention area is configured for agitation-free collection of sediment.

DETAILED DESCRIPTION OF A PREFERRED EMBODIMENT

Figure 1:
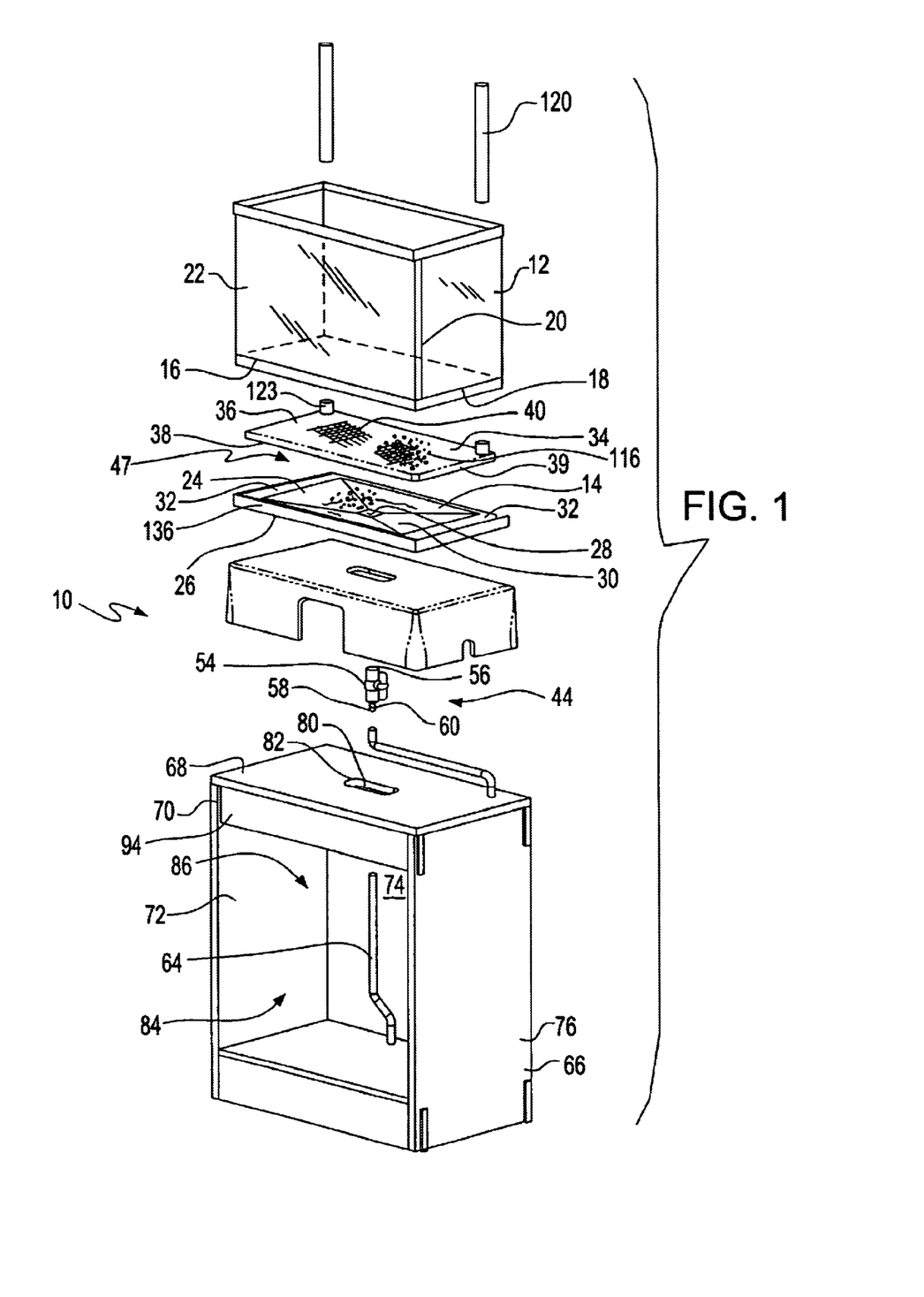
FIG. 1 is an exploded top perspective view of the present waterfall aquarium cleansing system.
Figure 2:
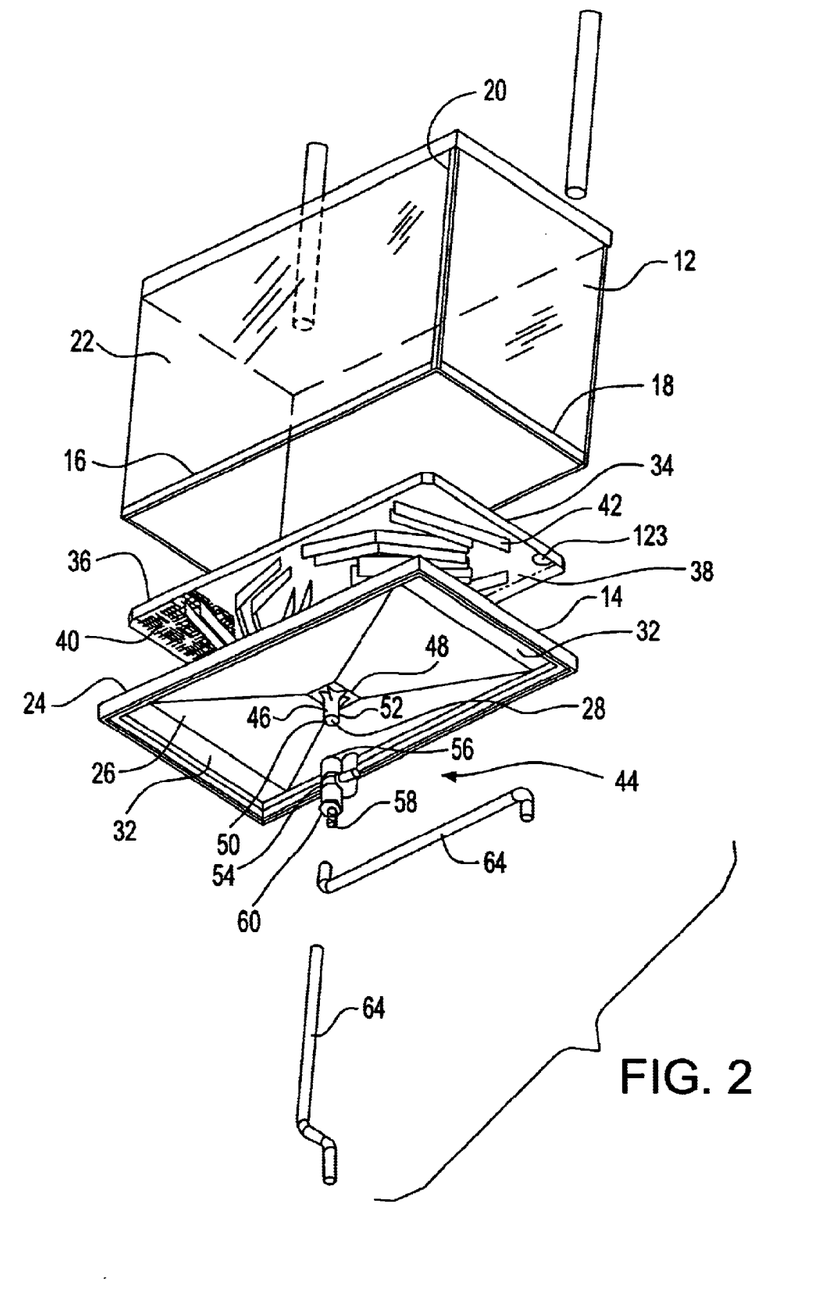
FIG. 2 is an exploded bottom perspective view of the present waterfall aquarium cleansing system depicting a drainage assembly.

Referring now to FIGS. 1 and 2, a waterfall aquarium cleansing system, generally designated 10, includes a multi-sided aquarium tank 12 which can be made in various sizes. The tank 12 further includes a base 14, a pair of first sides 16, a pair of second sides 18, and the first and second sides having a height 20 all defining a main chamber or main portion 22. Preferably, the tank 12 is manufactured from panels of transparent rigid material such as clear acrylic, glass or equivalent material. In a preferred embodiment, the base 14 is constructed and arranged to have a top 24 and a bottom 26 (best seen in FIG. 2). At least one aperture 28 is formed in the base 14 that passes through the base.

In a preferred embodiment, the base 14 is constructed and arranged to include a concave reservoir portion 30 (best seen in FIG. 1), that gradually tapers toward the at least one aperture 28. Preferably, the at least one aperture 28 is generally circular and centrally located in the concave reservoir portion 30. It is to be understood that the main portion 22 of the tank 12 is in fluid communication with the reservoir portion 30. The precise configuration of the reservoir portion 30 and the location of the at least one aperture may vary depending on the application. In the preferred embodiment, sides of the reservoir portion 30 are provided with laterally extending, generally planar portions 32 (best seen in FIG. 2).

A filter 34, preferably an undergravel filter, is disposed on top of and is also configured to be in fluid communication with the top 24 of the base 14. It is also seen that the filter 34 has a top side 36, an underside 38, a peripheral depending skirt 39, and is further constructed and arranged to be.porous, being equipped with apertures, preferably slotted holes 40. In the preferred embodiment, the underside 38 of the filter 34 is provided with at least one depending support rib 42 (seen best in FIG. 2) for rigidity of the filter 34 and also for flow manipulation. The skirt 39 allows the filter 34 to rest upon the base 14. At least some of the support ribs 42 contact the base 14. An advantage of the present system 10 is that the aperture 28 may be placed in close proximity to the filter 34 for promoting agitation-free movement of sediment from the main chamber 22 to the aperture 28. The support ribs 42 depend into the area below the filter 34 and perform a baffle function to prevent agitation of water in the reservoir 30. In addition, the support ribs promote an effective distribution of suction in the area of the filter 34 during regular operation and a venturi-like effect for enhanced flushing of collected sediment when a valve (described below) is opened to remove sediment through the aperture 28.

In addition, a retention area 47 is also provided which is defined on an upper end by the filter 34 and on a lower end by the base 14, and which includes the concave reservoir portion 30. The retention area 47 is preferably of a relatively short height, placing the aperture 28 in relatively close proximity to the filter 34 to promote agitation-free collection of sediment from the main chamber 22 for eventual removal through the aperture 28. The close proximity also promotes suction, enhancing cleaning efficiency and cycling of water.

Furthermore, a drainage assembly, generally designated 44, (seen best in FIG. 2) is constructed and arranged to be in fluid communication with the at least one aperture 28. Preferably included in the drainage assembly 44 is at least one tubular member 46 having a proximal end 48 and a distal end 50 is further included in the drainage assembly 44 and is in fluid communication with the aperture 28. The tubular member 46 is preferably a rigid plastic tube, and alternatively could be externally or internally threaded at its ends 48 and 50 (not shown) to threadedly engage the aperture 28. It is contemplated that if the tubular member 46 is internally threaded, the aperture 28 would include a depending nipple. The configuration and arrangement of the at least one tubular member 46 may vary to suit the application.

In the preferred embodiment, the tubular member 46 is integrally formed with the bottom 26 of the base 14. In an alternative embodiment of the present invention, the tubular member 46 may be provided at its proximal end 48 with a flange type bulkhead attachment 52 secured to the bottom 26 of the base 14 by chemical adhesive, RF welding or other known sealing attachment technology. Once sealed to the bottom 26 of the base 14, the tubular member 46 is in fluid communication with the at least one aperture 28.

Referring now to FIGS. 1 and 2, the drainage assembly 44 further includes a valve member 54 with a proximal end 56 and a distal end 58, and is constructed and arranged to be in fluid communication with the tubular member 46, and preferably engaged at the distal end 58. In a preferred embodiment, the valve member 54 is constructed and arranged to be a ball cock valve, preferably made of plastic. The valve member 54 is preferably constructed and arranged to have at least one of the ends 56 and 58, and preferably the end 58, configured as a barbed nozzle 60. It is also contemplated that the valve member 54 has at least one of the ends 56 and 58, and preferably the end 58, configured to receive other tubular connections. An optional drainage hose 64 may be provided and is configured for engaging the valve member 54, preferably by way of either the barbed nozzle 60 or by way of another tubular connection.

Figure 3:
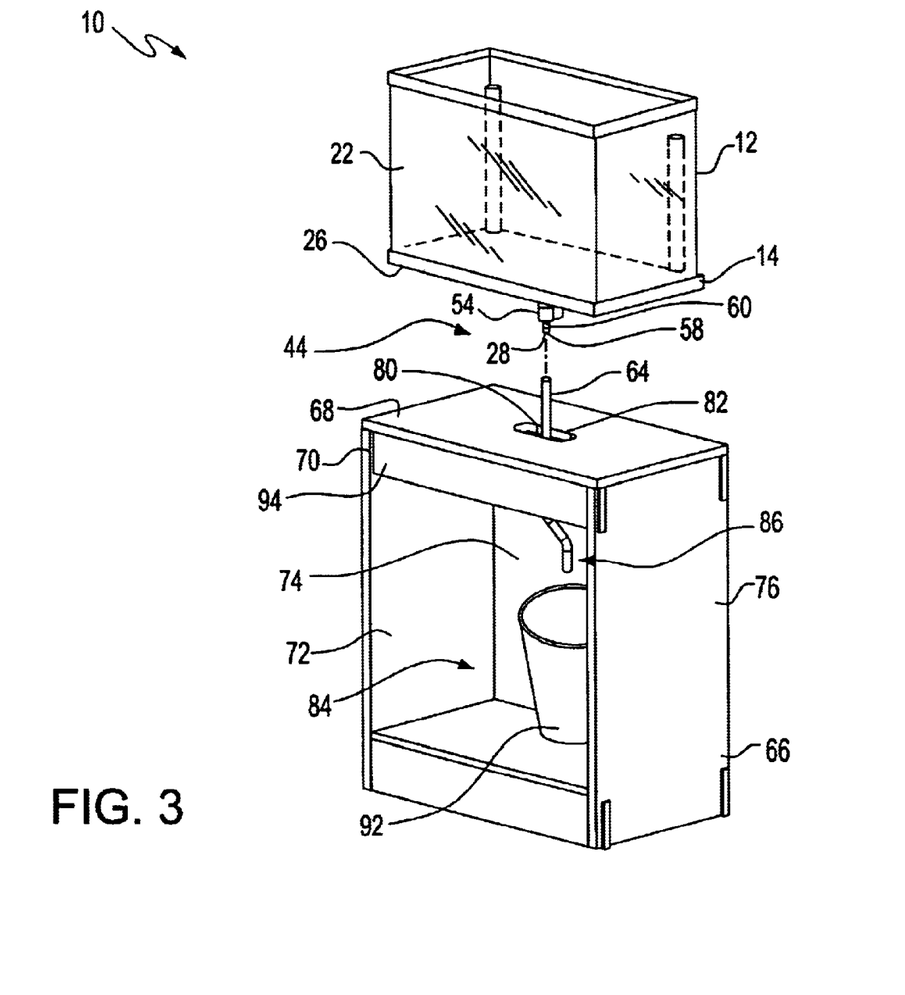
FIG. 3 is a partially exploded top perspective view of the present waterfall aquarium cleansing system depicting a preferred embodiment.
Figure 4:
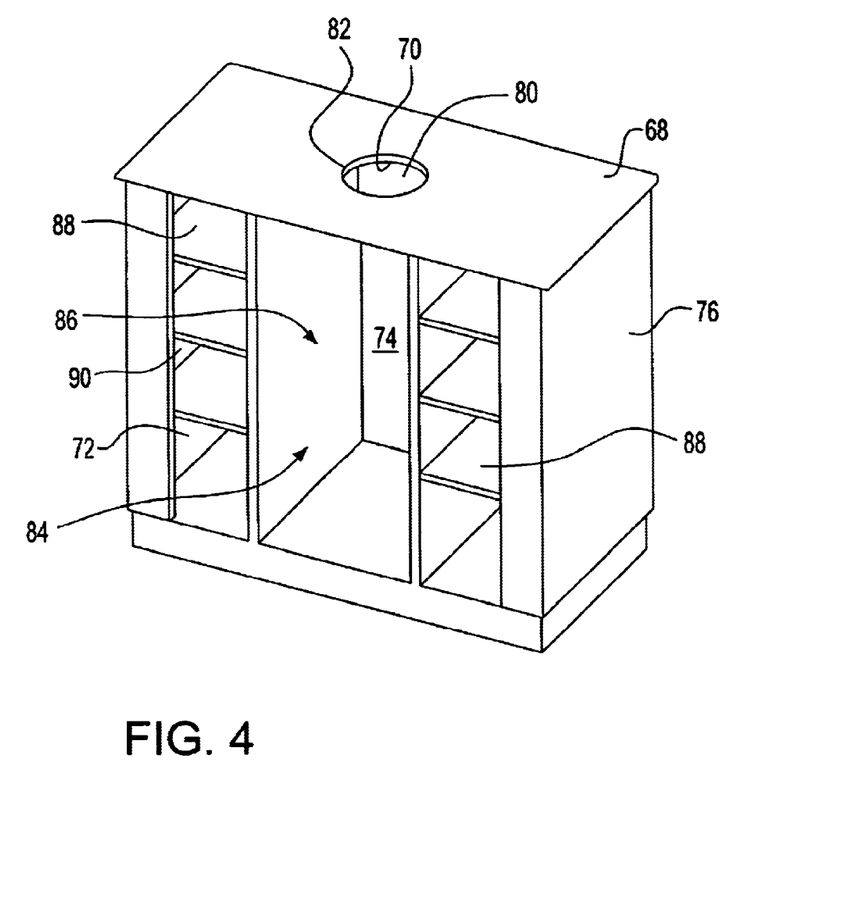
FIG. 4 is a top perspective view of a stand for the present waterfall aquarium cleansing system.

Referring now to FIGS. 1, 3 and 4, in a preferred embodiment of the present invention, a stand 66 may be provided having a top 68 and an underside 70. Preferably, the stand further includes a first sidewall 72, a back wall 74, a second sidewall 76, and an optional front wall 78 (seen best in FIG. 6). The top 68 of the stand 66 is constructed and arranged to receive the bottom 26 of the base 14. A center 82 of the top 68, is in communication with the at least one aperture 28, and the drainage assembly 44, when the optional drainage hose 64 is not included.

When the hose 64 is in use, in the embodiment 10, the opening 80 accommodates the aperture 28 and the drainage assembly 44. The opening 80 is configured to be a size suitable to allow for clearance of the drainage assembly 44 and to enable a user to have access to the drainage assembly from the underside 70 of the top 68. In the preferred embodiment, the stand 66 is preferably made of wood and is configured as a cabinet, however other suitable materials are contemplated. In addition, the stand 66 preferably is constructed and arranged to include an open area 84 in a center 86 under the top 68 and further preferably includes shelving members 88, engaged on at least one interior wall 90 of at least one of the first side and the second side walls 72 and 76 (seen best in FIG. 4).

Referring now to FIG. 3, the open area 84 of the stand 66 is preferably configured to be of a size suitable to allow room for a user to access the at least one aperture 28 and preferably the drainage assembly 44 and further to allow for placement of a suitable receptacle 92 to receive water and sediment drained from the tank 12 and emitted from the drainage hose 64, the aperture 28, or the distal end 58. It is also preferred that the stand 66 is constructed and arranged to include an apron 94, adjacent the top 68, which is configured to conceal the drainage assembly 44.

Figure 6:
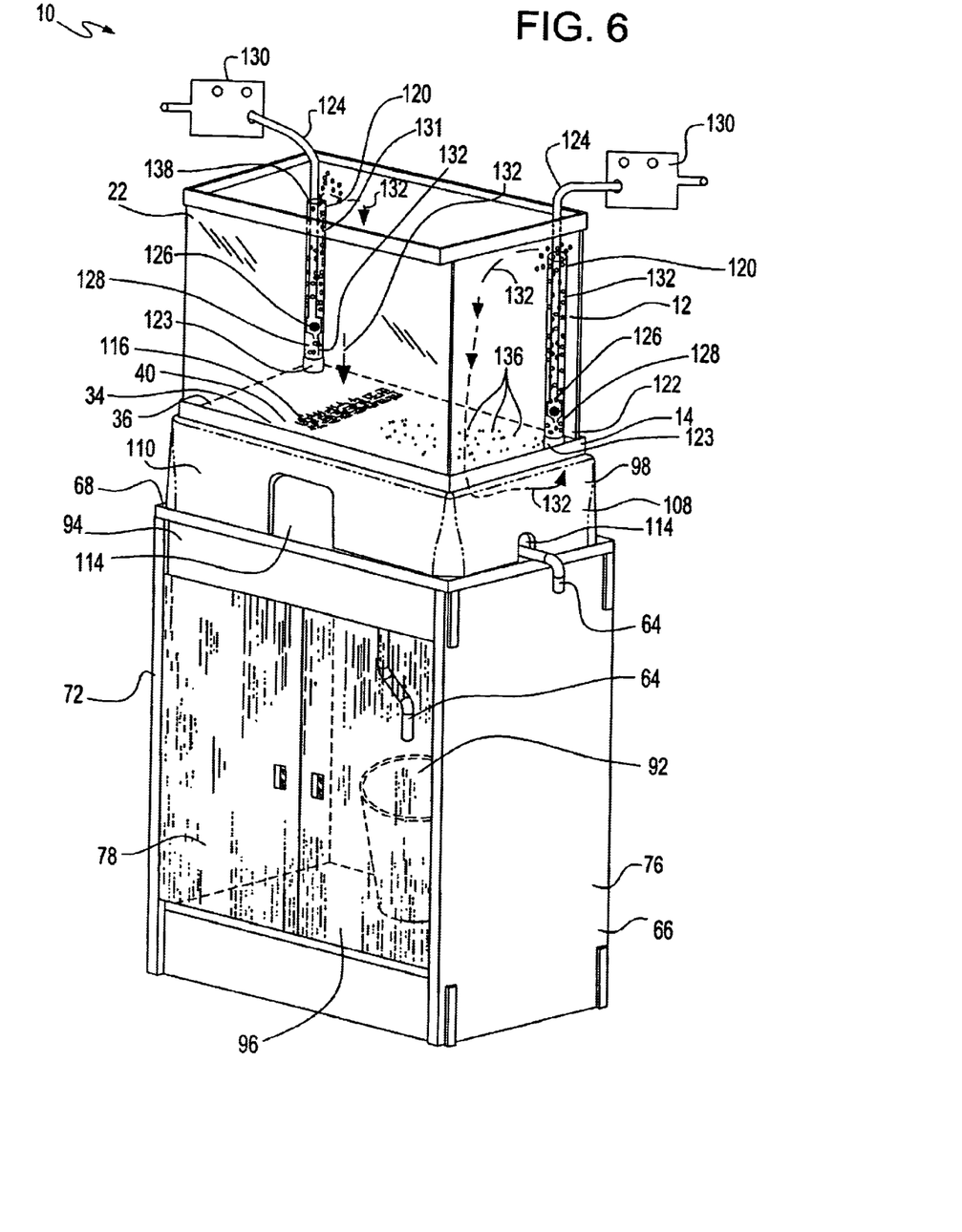
FIG. 6 is a perspective, assembled view of the present waterfall aquarium cleansing system.

Referring now to FIG. 6, it is also desirable to provide at least one door 96 as the front wall 78. If opaque, the door 96 will conceal the drainage assembly 44 when the door 96 is in a closed position.

Figure 5:
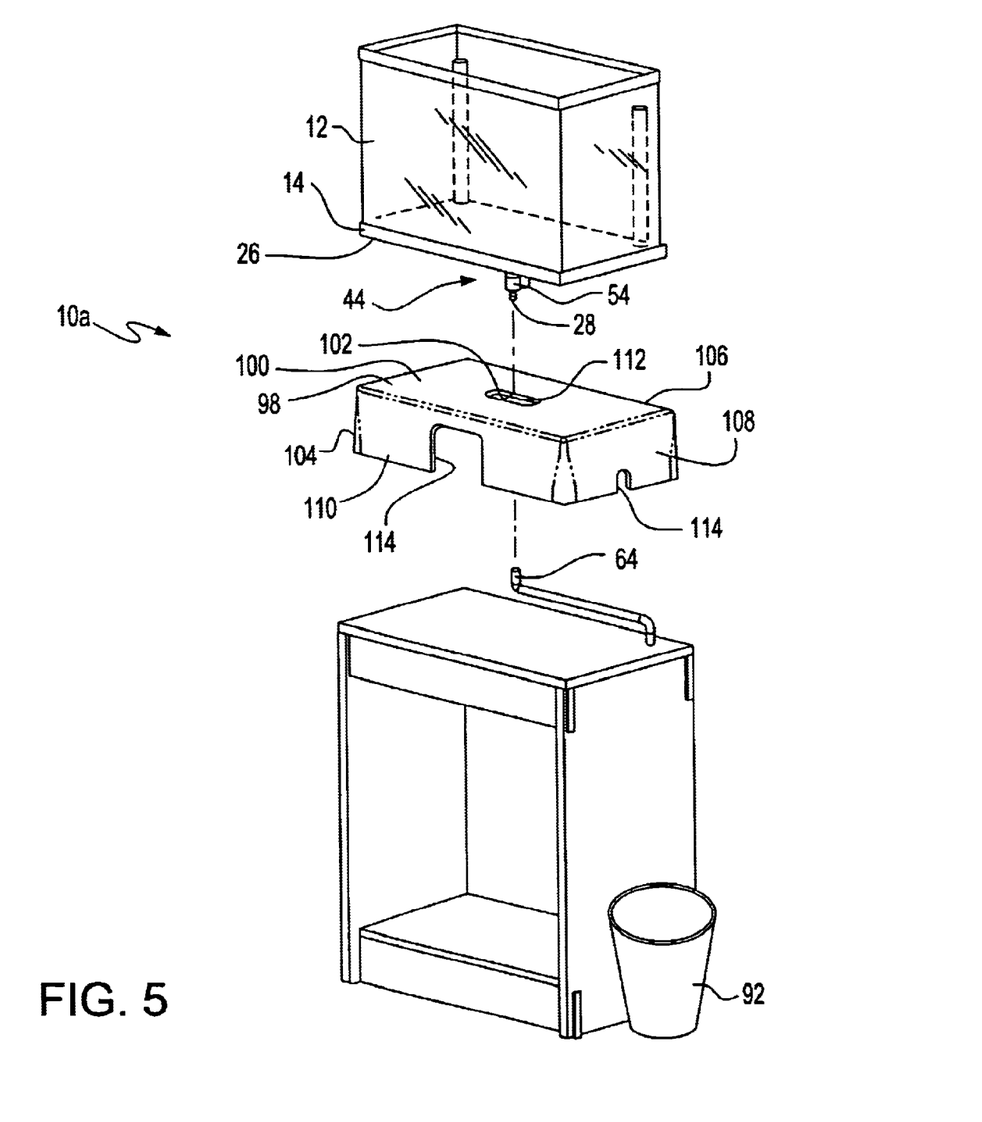
FIG. 5 is a partially exploded top perspective view of an alternative embodiment of the present waterfall aquarium cleansing system.

Referring now to FIG. 5, in an alternative embodiment 10a of the present invention, an elevated stage member 98 is provided and includes a top 100, an underside 102 a first side wall 104, a back wall 106, a second side wall 108, and a front wall 110. 20 The elevated stage member 98 is configured to receive the bottom 26 of the base 14.

At least one opening 112 is preferably centrally located on the top 100, to be in communication with the at least one aperture 28 and preferably, the drainage assembly 44. It is also preferred that the elevated stage member 98 be of a size suitable to allow for clearance of the drain assembly 44.

It is contemplated that the elevated stage member 98 will be used when the tank 12 is a smaller size, for example, 20 gallons or less, and/or when the user does not have the stand 66 configured with the opening 80. The stand 66 is preferably used when the tank 12 is 20 gallons or more. In a preferred embodiment, the elevated stage member 98 is molded in plastic or other equivalent rigid material. Also, the elevated stage member 98 could be disposed on any suitable substrate if a stand 66 is not employed.

In addition, at least one and preferably two openings 114 are provided in at least one of the walls 104, 106, 108, and 110. The at least one opening 114 is preferably of a size suitable to allow for an average sized hand of the user to access the aperture 28 and preferably, the drainage assembly 44. It will be understood that in the embodiment 10a, the drainage hose 64, configured to be used with the elevated stage member 98, is not optional and is engaged with the drainage assembly 44. It is also preferable that the at least two openings 114 are of a size suitable to allow the drainage hose 64 to pass through, and to allow for the average sized hand of a user to access the drainage assembly 44. It is further preferable in this embodiment that the drainage hose 64 pass through one of the at least two openings 114 to be in fluid communication with the receptacle 92.

In operation and referring to FIG. 6, it will first be seen that water is drawn from the main chamber 22 toward the filter 34 downward through a layer of gravel 116 disposed on the top side 36, and then further downward through the holes 40 of the filter 34 into the reservoir 30. At least one conventional lift tube 120 is provided, preferably by way of engagement with at least one boss formation 123 engaged with at least one rear corner 122 of the filter 34. In the preferred embodiment, the bosses 123 are located above the generally planar portions 32 (best seen in FIG. 2). The lift tube 120 is in fluid communication with the main chamber 22 and the reservoir 30, is preferably disposed above the gravel layer 116 and also has at least one internal air tube 124 extending almost all the way down the length of the lift tube 120. Also, at least one air stone 126 is preferably disposed at an end 128 of the air tube 124.

In addition, at least one air pump 130 is provided to pressurize air into the air tube 124. The air then preferably makes contact with the at least one air stone 126 which dissipates larger air bubbles into smaller air bubbles. The air is then forced outward into and rises up the lift tube 120 creating a rising column of air bubbles 131 along at least one of the sides of the tank 12 which then dissipate outward into a central portion of the main chamber 22. A circulation pattern 132 is created by the rising column of air bubbles 131 pushing outwardly into the main chamber 22. The pattern 132 causes water to be pulled upward from the reservoir 30 underneath the filter 34 into and upward through the lift tube 120, and then to dissipate into the tank 12.

The circulation pattern 132 causes water to be displaced from the lift tube 120 and to be replaced by water from underneath the filter 34. At the same time, water in the main chamber 22 of the tank 12 is being pulled downward toward and through the filter 34. Bacteria and debris-containing sediment 136 (best seen in FIG. 1) thus settle and accumulate in the concave reservoir portion 30 of the base 14, and depending on the frequency of drainage, in the retention area 47. The volume of sediment 136 and water usually sitting in the retention area 47 and the concave reservoir 30 of the base 14 is usually in the range of 5% to 10% of the total volume of the tank 12, for example, one to two gallons for a twenty gallon tank.

Furthermore, there are preferably charcoal capsules 138 (best seen in FIG. 6) disposed at the top of the lift tube 120 so that the filtered water being introduced into the main chamber 22 is less acidic. Flow rates accommodated by the filter 34 are calculated as is known in the art by the number of the lift tubes 120 and a volume of air that is pumped into the lift tubes 120 by way of the air pump 130.

To clean the tank, the user preferably places the receptacle 92 below the drainage assembly 44, or preferably the drainage hose 64, opens the valve member 54, drains some or all of the volume of the sediment 136 and water from the retention area 47, including the preferably concave reservoir 30 of the base 14, closes the valve member 54, and then disposes of the sediment 136 and the water. Whatever small volume of water that is removed from the base 14 is then replaced with fresh water poured into the main chamber 22.

The tank 12 is significantly cleaned only by draining out a portion of that volume of sediment 136 and water which settles in the concave reservoir 30 of the base 14 or in the retention area 47. The sediment 136 in the main chamber 22 of the tank 12 is never disturbed, nor, are the tank inhabitants. For a twenty-gallon tank, for example, approximately 1.25 gallons drained out of the base 14 would remove out all the sediment 136 and water below and between the gravel 116. This is considered a "full flush" of the system. However, regular cleaning maintenance for the tank 12 does not require a "full flush". If a user flushed 0.5 to 0.75 of a gallon, for a twenty-gallon tank, for example, biweekly to monthly, this would more than adequately maintain a significantly cleaner environment in the tank 12. The user of the present waterfall aquarium cleansing system reduces cleansing water volume by about 75% to 82%, and also significantly reduces labor to clean the tank 12 as compared to prior known methods.

Thus, the present waterfall aquarium cleansing system provides an easier and more efficient way to clean an aquarium. The aquarium owner is prevented from stirring up the sediment 136 in the main chamber 22 of the tank 12 so that the system virtually eliminates the disturbance of the tank inhabitants, and achieves a significantly cleaner tank.

While various embodiments of the present waterfall aquarium cleansing system have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

We claim:

1. A waterfall aquarium cleansing system comprising:
a tank having a base, a pair of first sides, a pair of second sides, the first and second sides having a height all defining a main chamber;
a filter in fluid communication with said base and disposed relative thereto to define a retention area above the base, said filter includes a plurality of support ribs depending into said retention area and configured for performing a baffle function to prevent the agitation of water in said retention area; and
said base defining at least one aperture in communication with said retention area to permit the periodic removal of sediment passing through said filter into said retention area, said retention area being configured for agitation-free collection of sediment.

2. The cleansing system of claim 1 further including a drainage assembly, and wherein said at least one aperture is in communication with said drainage assembly.

3. The cleansing system of claim 2 wherein said drainage assembly comprises:
   a tubular member having a proximal end and a distal end, and being in communication with said at least one aperture; and
   a valve member in communication with said tubular member.

4. The cleansing system of claim 3 wherein said tubular member is integrally formed with a bottom of said base.

5. The cleansing system of claim 3 wherein said tubular member is provided with a flange type bulkhead attachment.

6. The cleansing system of claim 3 wherein said valve member is constructed and arranged to be a ball cock valve having a proximal end and a distal end and wherein said proximal end is in communication with said tubular member.

7. The cleansing system of claim 6 wherein said valve member has an end configured as a barbed nozzle.

8. The cleansing system of claim 1 wherein said filter is an under gravel filter.

9. The cleansing system of claim 1 wherein said base is constructed and arranged to form a concave reservoir where sediment and water accumulate and wherein said concave reservoir gradually tapers toward said at least one generally centrally located aperture, said reservoir being in relatively close proximity to said filter to minimize the agitation of sediment being collected for removal through said at least one aperture.

10. The cleansing system of claim 1 further comprising a stand constructed and arranged to receive said base, and having at least one opening in communication with said at least one aperture.

11. The cleansing system of claim 10 wherein said stand further includes a top and an open area underneath said top, said open area configured to allow a user to access said drainage assembly.

12. The cleansing system of claim 1 further including an elevated stage member constructed and arranged to receive said base, and having at least one opening in communication with said at least one aperture.

13. The cleansing system of claim 12 wherein said elevated stage member is constructed and arranged to allow for clearance for said drainage assembly.

14. The cleansing system of claim 13 wherein said elevated stage member is constructed and arranged to have at least one opening in communication with a drainage hose, and also provides for access to said drainage hose.

15. A method for cleaning an aquarium, comprising:
   providing a tank having a base, a pair of first sides, a pair of second sides, the first and second sides having a height all defining a main chamber;
   providing a filter in fluid communication with said base and disposed relative thereto to define a retention area above the base, said base defining at least one aperture in communication with said retention area;
   providing aeration means in said main chamber above said retention area for introducing air into said main chamber above said filter; and
   said retention area being configured for agitation-free collection of sediment from said main chamber for subsequent removal through said at least one aperture.

16. The method of claim 15 further including creating a circulation pattern in said main chamber which causes air and water to flow upward adjacent said sides of said tank and downward towards a central area of said main chamber.

17. The method of claim 16 wherein said circulation pattern is created by at least one flow of bubbles from at least one lift tube generating bubbles outwardly into said main chamber.

18. A waterfall aquarium cleansing system comprising:
   a tank having a base, a pair of first sides, a pair of second sides, the first and second sides having a height all defining a main chamber;
   a filter in fluid communication with said base and disposed relative thereto to define a retention area above the base; and
   said base defining at least one aperture in communication with said retention area to permit the periodic removal of sediment passing through said filter into said retention area, said retention area being configured for agitation-free collection of sediment, said retention area being generally conically shaped and being bordered on respective sides by laterally extending generally planar portions.

19. The cleansing system of claim 18 further including aeration means disposed in said main chamber for aerating said water, said aeration means being secured to said filter above said generally planar portions.

* * * * *